United States Patent [19]

Bandlish

[11] Patent Number: 4,952,621
[45] Date of Patent: Aug. 28, 1990

[54] URETHANE SEALANTS OR COATING ADMIXTURES HAVING IMPROVED SHELF STABILITY

[75] Inventor: Baldev K. Bandlish, S. Euclid, Ohio

[73] Assignee: The B.F. Goodrich Company, Akron, Ohio

[21] Appl. No.: 419,066

[22] Filed: Oct. 10, 1989

Related U.S. Application Data

[63] Continuation of Ser. No. 202,353, Jun. 6, 1988, abandoned.

[51] Int. Cl.$^5$ ................................................. C08K 5/29
[52] U.S. Cl. ...................................... 524/195; 524/265
[58] Field of Search ........................... 524/195; 525/540

[56] References Cited

U.S. PATENT DOCUMENTS

| | | | |
|---|---|---|---|
| 3,193,522 | 7/1965 | Neumann et al. | 524/195 |
| 3,193,524 | 7/1965 | Holtschmidt et al. | 524/195 |
| 3,193,525 | 7/1965 | Kallert et al. | 524/195 |
| 3,267,078 | 8/1966 | Damusis | 260/77.5 |
| 3,378,517 | 4/1968 | Knipp et al. | 524/195 |
| 4,507,443 | 3/1985 | Barron et al. | 525/453 |

OTHER PUBLICATIONS

Article, "Advances in Polyurethane Technology", Maclaren and Sons Ltd., 1968, pp. 280–282, 285, 286, Buist et al.

*Primary Examiner*—Lewis T. Jacobs
*Attorney, Agent, or Firm*—James R. Lindsay; Daniel J. Hudak; Nestor W. Shust

[57] ABSTRACT

Polyurethane sealant and coating compositions made from blocked isocyanate-terminated prepolymers have improved shelf stability when an effective amount of a carbodiimide is utilized therewith. Such compositions and coating materials can be stored in sealed containers or cartridges for relatively long periods of time, for example in excess of five or six months, without significant loss of curability which adversely affects physical properties upon cure. One part as well as two part polyurethane sealant and coating compositions are stabilized by the addition of the carbodiimide stabilizing agent whereas the addition of an organosilane abates viscosity increase during storage.

19 Claims, No Drawings

URETHANE SEALANTS OR COATING ADMIXTURES HAVING IMPROVED SHELF STABILITY

This is a continuation of application Ser. No. 07/202,353, filed 06/06/88, now abandoned.

FIELD OF THE INVENTION

The present invention relates to a sealant composition or a coating admixture containing a blocked isocyanate-terminated prepolymer, a polyamine or a polyimine curing agent, and other conventional sealant or coating additives, wherein improved aged stability is obtained through the utilization of a carbodiimide stabilizing agent, and improved viscosity stability is obtained through the utilization of organosilanes. The present invention is applicable to both one part as well as two part urethane sealant or coating compositions.

BACKGROUND

Heretofore, only limited cure stability of one part and two part sealants and coatings based on blocked isocyanates has been achieved at the expense of mechanical properties of the cured sealants or coating compositions.

U.S. Pat. No. 3,267,078 to Damusis relates to limited shelf stabilities of from about 20 to 25 days at room temperature of blocked isocyanate-terminated prepolymers utilizing ketimine curing agents.

U.S. Pat. No. 4,507,443 to Barron et al relates to a sealant or coating composition made from blocked isocyanate-terminated prepolymers, a polyimine, and an organosilane as an adhesion promoter. Drying agents are also included to improve shelf stability.

Heretofore urethane sealant or coating compositions, such as the above, undergo a significant loss of curability, i.e., poor cure stability as measured by decreased Shore A and mechanical properties, and/or a significant increase in viscosity, i.e., poor viscosity stability.

SUMMARY OF THE INVENTION

The present invention relates to a urethane sealant or coating composition which has improved cure stability and retains significantly more of the original physical properties upon cure after aging. Such improvements are obtained through the utilization of effective amounts of carbodiimide compounds in either a one-part system or a two-part system. The one part urethane sealant or coating composition generally contains a blocked isocyanate-terminated prepolymer, a polyimine curing agent, an organosilane adhesion promoter, an organosilane drying agent, various fillers, plasticizers, waxes, oils, solvents, thixotropic agents, and the like. The two part urethane sealant or coating composition contains a base component and a curing component. The base component generally contains a blocked isocyanateterminated prepolymer, various fillers, plasticizers, waxes, oils, solvents, thixotropic agents, and the like. The base component can also contain drying agents such as molecular sieves, organosilanes, and the like, as well as various other compounds as utilized in the base component such as fillers, plasticizers, waxes, etc. The curative component generally contains a polyamine curing agent, fillers, etc. The use of the various carbodiimide compounds result in dramatic improvement in cure stability and in combination with organosilanes also results in improved viscosity stability.

DETAILED DESCRIPTION OF THE INVENTION

According to the present invention, carbodiimide compounds, as well as various organosilanes, are utilized to improve cure stability and viscosity stability of the urethane sealants or coatings and hence have good shelf stability. Considering the urethane prepolymers of the present invention, they are generally made from a polyisocyanate and any conventional polyol intermediate utilized in the preparation of urethane sealants or coatings. Thus, the polyol can be a polyether polyol, a polyester polyol, and the like, wherein the polyol is a diol or a triol. Such urethane intermediates are well known to the art and to the literature. Specific examples include polyethylene ether diols or triols, polypropylene ether diols or triols, polybutylene ether diols or triols, polytetramethylene ether diols or triols, and block copolymers, and/or mixtures of such diols and triols. Specific examples of hydroxylterminated polyesters include any hydroxy-terminated polyester prepared from poly-basic acids or anhydrides as for example adipic acid and phthalic anhydride, and polyols in which the hydroxyl functionality of the polyester prepolymer is preferably greater than 2. The intermediates generally have a molecular weight of from about 1,000 to about 25,000.

The polyisocyanates which are reacted with the polyol intermediates generally have the formula R(NCO)n wherein n is 2, 3 or 4 and R is an aliphatic, an aromatic, or an aliphatic substituted aromatic having from 4 to 20 carbon atoms and preferably from 6 to 15 carbon atoms. Desirably the aliphatic groups are alkyl groups. Examples of specific di- or triisocyanates which can be utilized include p,p',p"-triisocyanato triphenyl methane, p,p'-diisocyanato diphenyl methane (MDI), hexamethylene diisocyanate, naphthalene-1,5-diisocyanate, and various isomers of toluene diisocyanates (TDI) such as 2,4-tolylene diisocyanate, 2,6-tolylene diisocyanate, and mixtures thereof MDI and TDI are preferred. Inasmuch as an adhesive type composition is desired, the equivalent weight ratio of the polyisocyanate to the polyol intermediate, that is the NCO/OH ratio, is from about 1.8 to about 2.2 and preferably from about 2.0 to about 2.1. The formation of the prepolymer while occurring at ambient temperature is generally conducted at higher temperatures, to reduce the reaction time, as from between 40° to about 125° C. with from about 60° to about 100° C. being preferred.

In order to provide a base polymer that is more stable during storage, the isocyanate-terminated prepolymer described above is substantially "blocked" with a blocking agent that reacts with the terminal isocyanate groups of the prepolymer. Blocking agents useful in the present invention include any conventional blocking agents as well as those known to the art and to the literature that produce blocked terminal isocyanates that do not readily react with moisture in air at room temperature (about 25° C.) Examples of suitable blocking agents as well as techniques producing such blocked isocyanateterminated prepolymers are set forth in U.S. Pat. No. 4,502,443 to Barron which is hereby fully incorporated by reference. The amount of blocking agent utilized is such that the equivalent weight ratio of the blocking agent to the terminal isocyanate groups is at least 0.85 and can be a large excess since it can be used as a plasticizing agent.

The curing agents of the present invention include effective amounts of the various polyamine and the various polyimine compounds capable of curing the sealant composition or the coating admixture. The particular type of curing agent utilized generally depends upon whether a two-part urethane sealant or coating system is utilized or a one-part system. When a two-part system is utilized, the curing agent is contained as a separate component or composition which is not mixed with the prepolymer component or composition until immediately prior to application of the sealant or coating composition. Generally, any conventional polyamine curing agent can be utilized including those known to the art and to the literature. An example of a typical polyamine curing agent is a diamine or a triamine represented by the formula

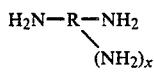

wherein R is an aliphatic, or an aliphatic substituted aromatic, with the aliphatic group being connected to the amine group, having from 1 to 25 carbon atoms and preferably from 2 to 10 carbon atoms, with x being 0 or 1, and preferably 0. Examples of specific amine compounds include ethylene diamine, butylene diamine, propylene diamine, decamethylene diamine, octamethylene diamine, and the like.

Another class of suitable polyamine compounds are the various amine terminated polyethers. These compounds are generally diamines or triamines containing polyether groups therein wherein the number of ether repeating units can vary as from about 2 or 3 up to about 150. The molecular weight of the amine terminated polyethers is generally from about 100 to about 5,000. Such compounds are produced by the Texaco Chemical Co. under the brand name Jeffamine, such as the M series, the D series, the ED series, the DU series, the BuD series, the BuD-2000 series and the Jeffamine T series. Such amine terminated polyethers are described in the bulletin, "The Jeffamine Polyoxyalkyleneamines", by the Texaco Chemical Co., Copyright 1985, NPD-024 102-0745, which is hereby fully incorporated by reference. A particularly preferred compound is the Jeffamine D-400.

Still another class of suitable polyamine compounds are the polyamide polyamines made from polyamines and dicarboxylic acids having from 2 to 36 carbon atoms such as oxalic acid, malonic acid, succinic acid, adipic acid, suberic acid, azelaic acid, dimerized fatty acids, trimerized fatty acids, and the like.

When a one-part system is utilized, that is a composition in which all of the components of the polyurethane sealant or coating are contained together, a polyimine curing agent is generally utilized. The polyimines will not react with the blocked isocyanateterminated prepolymer unless exposed to moisture as upon application of the sealant or coating. Various polyimines can be prepared by reacting any of the above polyamine compounds with either a ketone or an aldehyde as well known to those skilled in the art and to the literature. The end result is the production of various ketimine compounds or aldimine compounds. Examples of specific ketimine type compounds which can be utilized are set forth in U.S. Pat. No. 4,507,443 which is hereby fully incorporated by reference.

Regardless of whether a one-part or two-part system is utilized, the amount of the polyamine or polyimine curing agent is from about 0.6 to about 1.5 weight equivalents and preferably 0.8 to 1.2 weight equivalents per equivalent of a blocked isocyanate.

When a two-component system is utilized, as noted above, one of the components contains the prepolymer and the second component contains the curing agent. The curing agent component generally contains the amine curing agent, and various additives in conventional amounts, if desired, such as various plasticizers, pigments, thickeners, drying agents, and the like. The base component contains various conventional additives or compounding ingredients such as fillers, thixotropic agents, extenders, pigments, plasticizers, UV absorbers, solvents, and the like. Typically, the base component contains large amounts of a filler such as talc, various types of silicates, various types of clays, calcium carbonate, and the like, in an amount of from about 60 to about 200 parts by weight per 100 parts by weight of the prepolymer; a thickening agent such as a thixotropic compound in an amount of from 0 to about 30 parts by weight per 100 parts by weight of the prepolymer; UV absorbers in an amount of usually less than 1 or 2 parts by weight per 100 parts by weight of the prepolymer; and plasticizers in an amount of from about 0 to about 50 parts by weight per 100 parts by weight of the prepolymer. Solvents, which are generally utilized to adjust the viscosity of the prepolymer or base component to a desired range, constitute generally less than 10 percent volatility of the total prepolymer component for sealant compositions. In coating compositions, the amount of solvent is generally higher.

According to the concepts of the present invention, excessive loss of curability of the sealant or coating composition after aging of the sealant or coating composition is substantially prevented through the incorporation or blending of a carbodiimide compound into the base component. The carbodiimide compounds utilized generally have the formulation $R^1-N=C=N-R^2$ where $R^1$ and $R^2$, independently, can be an alkyl having from 1 to 25 carbon atoms and preferably from 6 to 12 carbon atoms, a cycloalkyl having from 4 to 25 carbon atoms, an aromatic or an alkyl substituted aromatic having from 6 to 15 carbon atoms, and the like. Specific examples of carbodiimide shelf stabilizing agents include dicyclohexyl, carbodiimide, diphenyl carbodiimide, and 2,2',6,6'-tetraisopropyldiphenyl carbodiimide, and the like with dicyclohexyl carbodiimide being preferred. Polymeric carbodiimides can also be utilized such as Staboxyl P made by Rhein-Cheme. Such carbodiimides have from about 2 to about 50 repeat units therein per molecule. Effective amounts of the carbodiimide are utilized so that upon application and cure of the stored coating or sealant to a surface in the presence of atmospheric moisture, mechanical properties are substantially retained as exemplified by the examples set forth hereinbelow. Such effective amounts are generally from about 0.1 to about 4.0 parts by weight and desirably from about 0.5 to about 2.0 parts by weight per 100 parts by weight of the blocked isocyanate-terminated prepolymer. Generally, compositions or coatings of the present invention containing the various carbodiimide compounds have an expected shelf stability of at least five or six months, as evidenced by heat aging data.

In order to prevent unsuitable viscosity increases of the urethane sealants or coating compositions of the present invention during storage (i.e., loss of viscosity stability) in containers or cartridges, various organosilanes in conjunction with carbodiimides are utilized to improve the viscosity stability. Effective amounts of organosilanes which prevent viscosity build-up during storage, range from about 0.1 to about 4.0 parts by weight and desirably from about 0.5 to about 2.0 parts by weight for every 100 parts by weight of the blocked isocyanate-terminated base polymer. A suitable type of an organosilane compound is an alkylalkoxysilane wherein the alkyl portion has from 1 to 15 carbon atoms, with from 1 to 4 carbon atoms being preferred and wherein from 1 to 3 alkoxy groups exist, preferably 3 alkoxy groups, containing from 1 to 6 carbon atoms, with from 1 to 2 carbon atoms being preferred. Examples of specific suitable alkylalkoxysilanes include methyltrimethoxysilane, butyltrimethoxysilane, octyltrimethoxysilane, methyltriethoxysilane, and the like, with methyltrimethoxysilane being preferred.

The invention will be better understood by reference to the following examples.

EXAMPLE 1

A blocked isocyanate-terminated polymer was formed according to the following procedure.

About 181.9 pounds of a polyol consisting of a copolymer of propyleneoxide with ethyleneoxide with an hydroxyl number of 26.7 was admixed with 18.75 pounds of toluene. To this mixture, 15.82 pounds of an 80/20 weight percent mixture of 2,4-tolylene diisocyanate and 2,6-tolylene diisocyanates were added at room temperature. The resulting mixture was heated to 85° C. and held at that temperature for two hours. Nonylphenol in an amount of 20.9 was then added to the mixture and the mixture was maintained for one hour at 85° C. About 6.2 grams of stannous octoate (a catalyst for promoting blocking of the isocyanate terminated prepolymer) were added to the mixture and the mixture was maintained for two hours and fifteen minutes The resulting reaction product was a blocked isocyanate terminated prepolymer.

Approximately 3000 grams of this polymer was formulated according to the recipe given in Table I. This recipe uses 52 parts of methyltrimethoxysilane to stabilize this formulation. This formulation is cured with 63 percent of stoichiometric amount of a ketimine prepared from Jeffamine D-400 and methylisobutylketone. This sealant formulation did not reach full cure in 12 weeks at room temperature as Shore A reached a value of 5-6. After aging for two weeks at 120° F., this sealant showed a Shore A hardness of 2-3 when cured for 28 days at room temperature.

EXAMPLE 2

Approximately 3000 grams of the polymer (described in Example 1) was formulated according to the recipe given in Table I. This recipe used 55.2 parts of the carbodiimide to stabilize this formulation. No methyltrimethoxysilane was used in this formulation. Surprisingly this formulation showed a Shore A hardness of 12-14 when cured for 12 weeks at room temperature (Control described in Example 1 which contained 52 parts of methyltrimethoxysilane showed a Shore A hardness of 5-6 when cured for 12 weeks at room temperature). After aging for two weeks at 120° F., this formulation showed a Shore A hardness of 18-20 when cured for 28 days at room temperature. The control in Example 1 under similar conditions showed a Shore A hardness of 2-3. This clearly shows that carbodiimides are better cure stabilizers as compared to organosilanes such as methyltrimethoxysilane.

TABLE I

| | EXAMPLE 2 | (Control) EXAMPLE 1 |
|---|---|---|
| Polymer (See Ex. 1) | 3000 | 3000 |
| Thixcin R, a Thixotrope, manufactured by NL Industries | 455 | 455 |
| Color 99-2653, a pigment dispersent, manufactured by Plasticolor | 200 | 200 |
| Benzoflex 9-88, a plasticizer, manufactured by Monsanto | 700 | 700 |
| Carbodiimide | 55.2 | 0 |
| Methyltrimethoxysilane | — | 52 |
| Calcium carbonate | 900 | 900 |
| Calcium sulphate | 900 | 900 |
| Calcium oxide | 18 | 18 |
| Paraffin wax | 65 | 65 |
| Process oil | 135 | 135 |
| Mineral spirits | 65 | 65 |
| Epoxysilane | 15 | 15 |
| Ketimine (95%) | 216 | 220 |
| Milliequivalents/100 | 40.4 | 39.95 |
| Cure Cycle | 12 W RT | 12 W RT |
| Shore A | 12-14 | 5-6 |
| 1 week at 120° F. & cured | 8 W | 8 W |
| Shore A | 12-14 | 2-3 |
| Cured | 12 W RT | 12 W RT |
| Shore A | 17-18 | 4-6 |
| 2 weeks at 120° F. & Cured | 28 days | 28 days |
| Shore A | 18-20 | 2-3 |

W - Weeks
RT - Room Temperature

EXAMPLE 3

Example 3 describes a formulation (recipe and data in Table 2) which is neither stabilized by carbodiimides nor by methyltrimethoxysilane, although initial sample showed a Shore A hardness of 22-23 when cured for 21 days at room temperature. After aging for 7 days at 120° F., it showed a Shore A hardness of 17 i.e., it lost 24.4 percent cure. After aging for 14 days at 120° F., the sample gelled showing an extreme viscosity increase.

EXAMPLE 4

Example 4 describes a formulation (see Table 2) which is stabilized with 52 parts of methyltrimethoxysilane. This sample showed a Shore A hardness of 28-30 when cured for 21 days at room temperature (control in Example 3 shows hardness of 22-23). After aging for 7 days at 120° F., it showed a Shore A hardness of 15-16 (cure loss of 46.5% as compared to 24% loss in control). When aged for 14 days at 120° F., it showed a Shore A hardness of 10-11 (cure loss of 63.8 percent).

EXAMPLE 5

Example 5 describes a formulation (see Table II) which is stabilized with 26 parts of carbodiimide. Initial cure for 21 days at room temperature showed a Shore A hardness of 28-30. After aging for 7 days at 120° F., it showed a Shore A hardness of 17-18 (cure loss of 39.6 percent as compared to 46.5% with methyltrimethoxysilane and 24 percent with no stabilizer). When aged for two weeks at 120° F., it showed a Shore A hardness of 12-14 (a cure loss of 55 percent as compared to 63.8 percent loss with methyltrimethoxysilane). Apparently carbodiimide gives a superior cure stability.

EXAMPLE 6

Example 6 describes a formulation (see Table II) which is stabilized with 60 parts of carbodiimide. Initial cure for 21 days at room temperature showed a Shore A hardness of 22–23. After aging at 120° F. for 7 days, it showed a Shore A hardness of 19–20 (a cure loss of 13.3 percent as compared to 24 percent with no stabilizer and 46.5 percent with methyltrimethoxysilane as the stabilizer). When aged for 14 days at 120° F., it showed a Shore A hardness of 17–18 (a cure loss of 22 percent as compared to 63.4 percent loss with methyltrimethoxysilane as the stabilizer). This example clearly shows that carbodiimides provide a better cure stabilization.

Hence, from the above examples, it is apparent that the urethane sealant or coating compositions of the present invention have improved shelf stability.

TABLE II

|  | EXAMPLE 3 | EXAMPLE 4 | EXAMPLE 5 | EXAMPLE 6 |
|---|---|---|---|---|
| Polymer (Ex. 1) | 3000 | 3000 | 3000 | 3000 |
| Thixcin-R | 455 | 455 | 455 | 455 |
| Color | 200 | 200 | 200 | 200 |
| Benzoflex 9-88 | 700 | 700 | 700 | 700 |
| MTMS - organosilanes | 0 | 52 | 17 | 0 |
| Carbodiimide | 0 | 0 | 0 | 60 |
| Calcium carbonate | 1800 | 1800 | 1800 | 1800 |
| Wax | 65 | 65 | 65 | 65 |
| Oil | 135 | 135 | 135 | 135 |
| Mineral spirits | 65 | 65 | 65 | 65 |
| Epoxysilane | 15 | 15 | 15 | 15 |
| Ketimine | 327.5 | 341 (95%) | 341 (95%) | 341 |
| Millieq./100 | 40.1 | 40.0 | 40.0 | 40.0 |
| Cure Cycle | 3 W RT | 3 W RT | 3 W RT | 3 W RT |
| Shore A | 22–23 | 28–30 | 28–30 | 24–26 |
| 1 week at 120° F. |  |  |  |  |
| Cure Cycle | 3 W RT | 3 W RT | 3 W RT | 3 W RT |
| Shore A | 17 | 15–16 | 17–18 | 21 |
| 2 Weeks at 120° F. |  |  |  |  |
| Shore A | gelled | 3 W RT 10–11 | 3 W RT 12–14 | 3 W RT 18–20 |
| MOD 0W/120° F. | — | — | 63 | — |
| Tensile | — | — | 220 | — |
| Elongation | — | — | 775 | — |
| Flow Viscosity, Sec |  |  |  |  |
| Initial | 40.5 | 22.3 | 29.1 | 32.0 |
| 1W/120° F. | 238 | 80.7 | 124 | 135.4 |
| 2W/120° F. | gelled | 124 | 277 | 1710 |

TABLE III

|  | EXAMPLE 7 | EXAMPLE 8 | EXAMPLE 9 |
|---|---|---|---|
| Polymer (Ex. 1) | 3000 | 3000 | 3000 |
| Thixcin-R | 455 | 455 | 455 |
| Color | 200 | 200 | 200 |
| Benzoflex 9-88 | 700 | 700 | 700 |
| MTMS | 0 | 0 | 0 |
| Carbodiimide | 0 | 60 | 122 |
| Calcium carbonate | 1800 | 1800 | 1800 |
| Wax | 65 | 65 | 65 |
| Oil | 135 | 135 | 135 |
| Mineral spirits | 65 | 65 | 65 |
| Epoxysilane | 15 | 15 | 15 |
| Ketimine | 327.5 | 291 | 291 |
| Mil. Eq./100 gram | 40.0 | 40.1 | 40.1 |
| Cure Cycle | 3 W RT | 3 W RT | 3 W RT |
| Shore A (Avg.) | 22.5 | 22.5 | 19 |
| 1 week at 120° F. |  |  |  |
| Cure Cycle | 3 W RT | 3 W RT | 3 W RT |
| Shore A | 17 | 20–22 | 18 |

Table III compares Examples 7, 8 and 9 in which respectively, no carbodiimide, 60 parts, and 122 parts by weight have been utilized. Inasmuch as no viscosity stabilizer was utilized, gel did occur. However, utilization of the carbodiimide resulted in a dramatic increase of Shore A hardness after a two week cure cycle at 120° F.

TABLE IV

|  | EXAMPLE 10 | EXAMPLE 11 | EXAMPLE 12 | EXAMPLE 13 |
|---|---|---|---|---|
| Polymer (Ex. 1) | 3000 | 3000 | 3000 | 3000 |
| Thixcin-R | 455 | 455 | 455 | 455 |
| Color | 200 | 200 | 200 | 200 |
| Benzoflex 9-88 | 700 | 700 | 700 | 700 |
| Carbodiimide | 60 | 60 | 30 | 20 |
| MTMS | 0 | 26 | 26 | 17 |
| Calcium carbonate | 1800 | 1800 | 1800 | 1800 |
| Paraffin wax | 65 | 65 | 65 | 65 |
| Process Oil | 135 | 135 | 135 | 135 |
| Mineral spirits | 65 | 65 | 65 | 65 |
| Epoxysilane | 15 | 15 | 15 | 15 |
| Ketimine | 341 (95%) | 341 (95%) | 341 (95%) | 341 (95%) |
| Mil. Eq./100 gram 0W/120° F. | 40.0 | 40.0 | 40.0 | 40.0 |
| Cure Cycle | 3 W RT | 3 W RT | 3 W RT | 3 W RT |
| Shore A | 24–26 | 22–23 | 17–18 | 18 |
| 2 Weeks at 120° F. |  |  |  |  |
| Cure Cycle | 3 W RT | 3 W RT | 3 W RT | 3 W RT |
| Shore A | 18–20 | 15–17 | 16–17 | 15–16 |
| Flow Viscosity |  |  |  |  |
| 0W/120° F., sec | 32 | 57.9 | 38.5 | 47 |
| 1W/120° F., sec | 135.4 | 159.8 | 118 | 181 |
| 2W/120° F., sec | 1710 | 418.7 | 230 | 382 |

Data in Examples 10, 11, 12 and 13 clearly shows that the addition of carbodiimide and MTMS together in the formulation gives a significant improvement in viscosity stability and cure stability. Examples 1 to 9 show that addition of carbodiimide improves cure stability without a significant improvement in viscosity stability. These examples further show that addition of MTMS improves viscosity stability but cure stability remains poor.

EXAMPLES 14–16

A base component for a two-part sealant was prepared according to the recipe given in Table V. Data in Table V clearly shows that the batch containing a carbodiimide showed the best viscosity as well as cure stability. Example 14 used wet fillers along with a carbodiimide, Example 15 used wet fillers, and Example 16 used dry fillers.

TABLE V

|  | EXAMPLE 14 | EXAMPLE 15 | EXAMPLE 16 |
|---|---|---|---|
| Polymer (Ex. 1) | 690 | 692.5 | 692.5 |
| Calcium Carbonate | 1587.5 | 1597.5 | 1597.5 |
| DIDP (diisodecylphthalate) | 172.5 | 172.5 | 172.5 |
| Paraffin wax | 18.0 | 18.0 | 18.0 |
| Process Oil | 9.0 | 9.0 | 9.0 |
| Gamma-glycidoxypropyltrimethoxysilane | 3.5 | 3.5 | 3.5 |
| Staboxyl 1 (a carbodiimide) | 12.5 | 0 | 0 |
| Water content in fillers | 0.24 moles | 0.24 moles | 0.01 moles |
| Pot Life | 9 hours | 15 hours | 13 hours |
| Flow Viscosity after |  |  |  |
| 0 week at 120° F., sec | 58 | 103.5 | 74 |
| 1 week at 120° F., sec | 62 | 233 | 132 |
| 2 weeks at 120° F. | 136 | Gelled | 170 |
| Shore A Hardness (14 Days Cure) |  |  |  |
| 0 week at 120° F. | 41 | 30 | 40 |

TABLE V-continued

|  | EXAMPLE 14 | EXAMPLE 15 | EXAMPLE 16 |
|---|---|---|---|
| 1 week at 120° F. | — | 13 | 39 |
| 2 weeks at 120° F. | 39 | — | 31 |
| Shore A Hardness (21 Days Cure) | | | |
| 0 week at 120° F. | 47 | 44 | 47 |
| 1 week at 120° F. | 49 | 20 | 42 |
| 2 weeks at 120° F. | 45 | — | 37 |

While in accordance with the Patent Statutes, the best mode and preferred embodiment has been set forth, the scope of the invention is not limited thereto, but rather by the scope of the attached claims.

What is claimed is:

1. A urethane sealant composition or coating admixture having improved shelf stability, comprising:
   a blocked isocyanate-terminated urethane base prepolymer sealant composition or coating admixture, said urethane prepolymer made from a polyether polyol or a polyester polyol intermediate and a polyisocyanate having the formula $R(NCO)_n$ where n is 2, 3 or 4, and R is an aliphatic, an aromatic, or an aliphatic substituted aromatic having from 4 to 20 carbon atoms,
   an effective amount of a polyamine or a polyimine curing agent capable of curing the sealant composition or the coating admixture, and
   an effective amount to improve viscosity stability during storage of an organic silane consisting essentially of an alkylalkoxysilane wherein said alkyl group has from 1 to 15 carbon atoms, wherein the number of alkoxy groups is from 1 to 3, and wherein the hydrocarbon portion of said alkoxy is an alkyl having from 1 to 6 carbon atoms, and from about 0.1 to about 4.0 parts by weight of a carbodiimide for every 100 parts by weight of said blocked base polymer to impart improved shelf age stability to said uncured isocyanate blocked urethane sealant composition or coating admixture so that the Shore A Hardness is substantially retained after storage and subsequent curing by exposure to atmospheric moisture.

2. A urethane sealant composition or coating admixture according to claim 1, wherein said carbodiimide compound has the formula

$$R^1-N=C=N-R^2$$

where $R^1$ and $R^2$, independently, is an alkyl having from 1 to 25 carbon atoms, a cycloalkyl having from 5 to 25 carbon atoms, or an aromatic or an alkyl substituted aromatic having from 6 to 15 carbon atoms, or where said carbodiimide is a polycarbodiimide having from 2 to 50 carbodiimide units therein.

3. A urethane sealant composition or coating admixture according to claim 2, wherein $R^1$ and $R^2$, independently, is an alkyl having from 6 to 12 carbon atoms, or a cycloalkyl having from 4 to 8 carbon atoms, and wherein said effective amount of said alkylalkoxysilane is from about 0.1 to about 4.0 parts by weight for every 100 parts by weight of said blocked isocyanate-terminated base polymer.

4. A urethane sealant composition or coating admixture according to claim 3, wherein the amount of said carbodiimide is from about 0.5 to about 2.0 parts by weight for every 100 parts by weight of said blocked base polymer, and wherein said shelf stability is for a period of at least five months.

5. A urethane sealant composition or coating admixture according to claim 4, wherein said alkylalkoxysilane has an alkyl group having from 1 to 4 carbon atoms, three alkoxy groups, and wherein the hydrocarbon portion of said alkoxy is an alkyl having 1 or 2 carbon atoms.

6. A urethane sealant composition or coating admixture according to claim 5, wherein said carbodiimide is dicyclohexyl carbodiimide.

7. A urethane sealant composition or coating admixture according to claim 6, wherein said alkylalkoxysilane is methyltrimethoxysilane.

8. A urethane sealant composition or coating admixture according to claim 1, wherein the urethane sealant composition or coating admixture is a one-part system, and wherein said curing agent is said polyimine curing agent.

9. A urethane sealant composition or coating admixture according to claim 4, wherein the urethane sealant composition or coating admixture is a one-part system, and wherein said curing agent is said polyimine curing agent.

10. A urethane sealant composition or coating admixture according to claim 5, wherein the urethane sealant composition or coating admixture is a one-part system, and wherein said curing agent is said polyimine curing agent.

11. A urethane sealant composition or coating admixture according to claim 7, wherein the urethane sealant composition or coating admixture is a one-part system, and wherein said curing agent is said polyimine curing agent.

12. The cured urethane sealant or coating admixture of claim 8.

13. The cured urethane sealant or coating admixture of claim 9.

14. The cured urethane sealant or coating admixture of claim 10.

15. The cured urethane sealant or coating admixture of claim 11.

16. A urethane sealant composition or coating admixture according to claim 4, wherein the urethane sealant composition or coating admixture is a two-part system, and wherein said curing agent is said polyamine curing agent.

17. The cured urethane sealant or coating admixture of claim 16.

18. A cured urethane sealant or coating admixture according to claim 4, wherein the urethane sealant composition or coating admixture is a two-part system, wherein said curing agent is said polyamine curing agent.

19. The cured urethane sealant or coating admixture of claim 18.

* * * * *